(12) United States Patent
Tashiro et al.

(10) Patent No.: US 9,093,118 B2
(45) Date of Patent: Jul. 28, 2015

(54) INFORMATION REPRODUCING APPARATUS AND INFORMATION REPRODUCING METHOD

(71) Applicant: Kabushiki Kaisha Toshiba, Tokyo (JP)

(72) Inventors: Masami Tashiro, Tokyo (JP); Hiroyuki Chiba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 13/953,329

(22) Filed: Jul. 29, 2013

(65) Prior Publication Data

US 2014/0281807 A1 Sep. 18, 2014

(30) Foreign Application Priority Data

Mar. 18, 2013 (JP) ................. 2013-055715

(51) Int. Cl.
*G11C 29/00* (2006.01)
*G11B 20/18* (2006.01)

(52) U.S. Cl.
CPC .................. *G11B 20/1803* (2013.01)

(58) Field of Classification Search
CPC ............ G11B 20/1803; G11B 20/10009; G11B 20/10277; G11B 20/10296; G11B 20/10305; G11B 20/1037; G11B 20/10462; G11B 20/18; G11B 20/1879; G11B 20/10046; G11B 2020/10972; G11B 2020/183; G06F 11/10; H03M 13/6343; H03M 13/3715; H03M 13/3738

See application file for complete search history.

(56) References Cited

U.S. PATENT DOCUMENTS

| | | | |
|---|---|---|---|
| 6,668,349 B1 * | 12/2003 | Sawaguchi | 714/755 |
| 7,136,244 B1 * | 11/2006 | Rothberg | 360/53 |
| 7,818,651 B2 * | 10/2010 | Nagai et al. | 714/762 |
| 2002/0034142 A1 | 3/2002 | Tani et al. | |
| 2003/0235098 A1 * | 12/2003 | Chiba | 365/201 |
| 2004/0257888 A1 * | 12/2004 | Noguchi et al. | 365/200 |
| 2010/0095190 A1 | 4/2010 | Kanaya | |
| 2010/0290151 A1 | 11/2010 | Kondo et al. | |
| 2011/0010601 A1 * | 1/2011 | Maeto | 714/752 |

FOREIGN PATENT DOCUMENTS

| | | |
|---|---|---|
| JP | 2007200552 A | 8/2007 |
| JP | 2009043410 A | 2/2009 |
| JP | 2010-092561 | 4/2010 |
| JP | 2010-267346 | 11/2010 |

\* cited by examiner

*Primary Examiner* — Guerrier Merant
(74) *Attorney, Agent, or Firm* — Patterson & Sheridan, LLP

(57) ABSTRACT

An information reproducing apparatus includes a read unit configured to read data a multiple number of times, a data evaluation unit configured to generate data to be corrected, based on an evaluation on a bit basis of each of a plurality of pieces of data acquired as result of reading the data multiple number of times, and a correction unit configured to correct an error using the data to be corrected generated by the data evaluation unit.

17 Claims, 3 Drawing Sheets

FIG. 4

| Read Count | | Bit0 | Bit1 | Bit2 | Bit3 | ... | BitN |
|---|---|---|---|---|---|---|---|
| 1st. | 45% | 1 | 0 | 1 | 0 | ... | ... |
| 2nd. | 30% | 1 | 0 | 0 | 1 | .... | .... |
| 3rd. | 25% | 1 | 0 | 1 | 1 | .... | .... |
| AVE. | — | 1 | 0 | 0.7 | 0.55 | .... | .... |
| Round Off | — | 1 | 0 | 1 | 1 | .... | .... |

FIG. 5

| Read Count | Bit0 | Bit1 | Bit2 | Bit3 | ... | BitN |
|---|---|---|---|---|---|---|
| 1st. | −0.85 | 0.62 | 1.10 | −1.39 | ... | ... |
| 2nd. | −0.62 | 0.85 | 0.62 | −2.20 | .... | .... |
| 3rd. | −0.41 | −0.20 | 1.39 | −1.73 | .... | .... |
| AVE. | −0.62 | 0.42 | 1.03 | −1.77 | .... | .... |
| Estimated Value | 0 | 1 | 1 | 0 | .... | .... |

INFORMATION REPRODUCING APPARATUS AND INFORMATION REPRODUCING METHOD

CROSS-REFERENCE TO RELATED APPLICATION

This application is based upon and claims the benefit of priority from Japanese Patent Application No. 2013-055715, filed Mar. 18, 2013, the entire contents of which are incorporated herein by reference.

FIELD

Embodiments described herein relate generally to an information reproducing apparatus and an information reproducing method for reproducing information.

BACKGROUND

Recently, an information reproducing apparatus such as a hard disk drive (HDD) and an SSD acquires more reliable information by repeatedly reading information judged to have low reliability. For example, based on a plurality of pieces of information that are acquired as a result of repeated reading, a value is evaluated on a bit basis, and, as a result of evaluation, the information in which the value with a higher frequency on a bit basis is adopted. Alternatively, a parameter for reproduction is changed during repeated reading, and the most reliable information is adopted.

However, the reliability of each of a plurality of pieces of information that are acquired as a result of repeated reading is not evaluated.

DESCRIPTION OF THE DRAWINGS

FIG. 4 is an example of the evaluation result of a plurality of pieces of information read repeatedly during the information reproduction process according to the embodiment; and FIG. 5 is another example of the evaluation result of a plurality of pieces of information read repeatedly during the information reproduction process according to the embodiment.

DETAILED DESCRIPTION

Embodiments provide an information reproducing apparatus and an information reproducing method capable of suitably acquiring more reliable information based on a plurality of pieces of information that are acquired as a result of repeated reading.

In general, according to one embodiment, an information reproducing apparatus includes a recording medium having data recorded thereon, a read unit configured to read the data from the recording media a multiple number of times, a data evaluation unit configured to generate data to be corrected, based on a bit-based evaluation result of each of a plurality of pieces of data acquired as result of reading the data multiple number of times, and a correction unit configured to correct an error using the data to be corrected generated by the data evaluation unit.

Embodiments will now be described with reference to the drawings. Note that the present disclosure is not limited to the following embodiments, and any component may be altered to embody the invention without departing from the spirit of the present disclosure. In addition, various other embodiments can be produced by the appropriate combination of a plurality of components disclosed in the following embodiments. For example, some components may be eliminated and some components may be combined appropriately.

Figure 1:
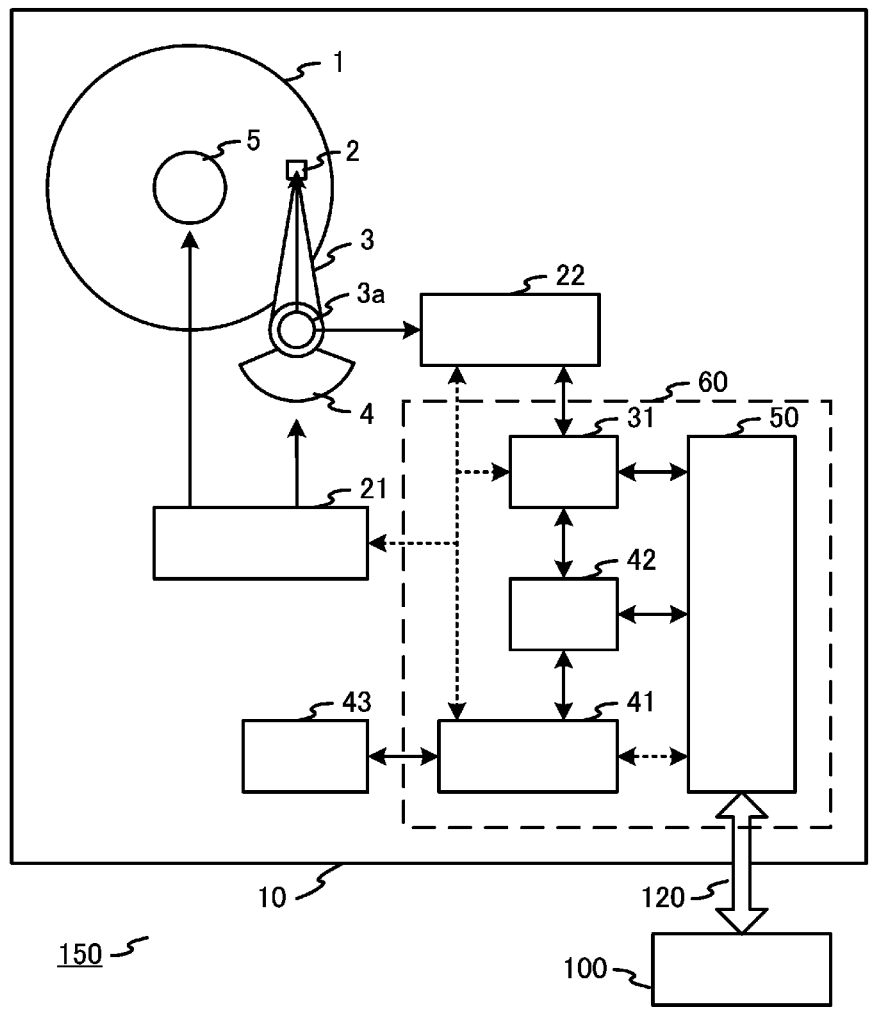
FIG. 1 is a block diagram showing the configuration of an information reproducing apparatus in which embodiments may be practiced.

FIG. 1 is a block diagram showing the configuration of electronic system 150 including a magnetic disk unit (hereinafter referred to as HDD) 10 serving as an information reproducing apparatus in which embodiments may be practiced. The electronic system 150 includes a host device 100 and the HDD 10. A host I/F 120 connects the host device 100 and the HDD 10, and is used to transmit and receive commands and user data between the host device 100 and the HDD 10. The HDD 10 is connected to the host device 100 through the host I/F 120, and operates as a memory device of the host device 100. An example of the electronic system 150 includes a personal computer and a mobile device, and an example of the host device 100 includes a chipset IC provided in a personal computer and the like.

Although the HDD 10 is taken as an example of the information reproducing apparatus in this embodiment, the configuration of the embodiment may be applied to an information reproducing apparatus for reproducing information recorded on a recording medium, such as a recording device in which a semiconductor memory serves as a recording medium (SSD and memory card), an optical disk drive, or a magneto-optical disk drive.

The HDD 10 includes a magnetic disk 1, a slider 2, an arm 3, a VCM (voice coil motor) 4 and an SPM (spindle motor) 5. The HDD 10 also includes circuit blocks including a motor driver 21, a head IC 22, an NVRAM (non-volatile RAM) 43 and a controller 60. The controller 60 includes a read/write channel unit (hereinafter also referred to as an RDC) 31, a CPU 41, an RAM 42 and an HDC (Hard Disk Controller) 50.

The HDD 10 according to the embodiment reproduces information recorded magnetically on the magnetic disk 1. The HDD 10 repeatedly reads the same information in accordance with the judgment result of the reliability of the reproduced information. The HDD evaluates, on a bit basis, the reliability of a plurality of pieces of information which are read repeatedly. By evaluating reliability on a bit basis, the information reproducing apparatus according to the embodiment can suitably acquire more reliable information based on the plurality of pieces of information acquired as a result of repeated reading.

The magnetic disk 1 is fixed to the SPM 5 and rotates with the rotation of the SPM 5. At least one surface of the magnetic disk 1 is a recording surface on which information is recorded magnetically. That is, the magnetic disk 1 is a magnetic recording medium. For example, a plurality of concentric tracks are defined on the recording surface, and each track has a servo area and a data area. The servo area has recorded thereon servo information including location information indicating a physical address on the recording surface of the magnetic disk 1. The slider 2 is positioned in a predetermined track on the recording surface based on the servo information, and the information recorded on the predetermined track on the data area is reproduced.

The slider 2 is provided at one end of the arm 3 so as to correspond to the recording surface of the magnetic disk 1.

The slider 2 includes a read head 2R and a write head 2W. The read head 2R magnetically reads information recorded on the recording surface of the magnetic disk 1. A signal that is read is output to the head IC 22 through a wire pattern on the arm 3. The write head 2W magnetically records information on the recording surface of the magnetic disk 1 in accordance with a write signal (write current) input from the head IC 22 through the wire pattern on the arm 3.

The arm 3 has the slider 2 at one end thereof, and a bearing 3a at the other end thereof. The arm 3 rotates about the central axis of the bearing 3a in accordance with a driving signal (current) supplied to the VCM 4 to move the slider 2 radially on the recording surface of the magnetic disk 1.

The VCM 4 is driven rotationally in accordance with a driving signal supplied from the motor driver 21 to rotate the arm 3.

The SPM 5 is driven rotationally in accordance with a driving signal (current) supplied from the motor driver 21 to rotate the magnetic disk 1.

The motor driver 21 supplies a driving signal used for driving the VCM 4 to the VCM 4, and supplies a driving signal used for driving the SPM 5 to the SPM 5 based on a control signal from the controller 60 (more specifically, the CPU 41).

The head IC 22 amplifies a signal input from the read head 2R provided on the slider 2, and outputs the amplified signal to the controller 60 (more specifically, RDC 31) as read information. The head IC 22 also outputs a write signal (write current) according to recording information output from the controller 60 (or RDC 31) to the write head 2W provided on the slider 2.

The controller 60 may be configured as an SoC (System On Chip) including the RDC 31, the CPU 41, the RAM 42 and the HDC 50. In the embodiment, the controller 60 controls an information reproduction process in which more reliable information is suitably acquired based on a plurality of pieces of information read repeatedly from the same portion of the magnetic disk 1. Note that the controller 60 may include no RAM 42, and the RAM 42 may be connected outside the controller 60.

The RDC 31 detects servo information corresponding to the servo area from the read information output from the head IC 22, and extracts address information and location information from the detected servo information. The extracted address information and location information are output to the CPU 41. The RDC 31 also detects information corresponding to the data area from the read information, and decodes the detected information. The decoded information is output to the HDC 50. Information determined to have an error during decoding is subjected to an error correction process. The RDC 31 generates information indicating the credibility of information during decoding of information. The RDC 31 also encodes information to be recorded which is input from the HDC 50, and outputs the encoded information to the head IC 22 as recorded information. The RDC 31 uses the RAM 42 for these processes as a working memory.

The CPU 41 controls each block provided in the HDD 10 to perform a plurality of processes based on program data (firmware) stored in the NVRAM 43 or the magnetic disk 1. For example, the CPU 41 controls the operations of the positioning process of the read head 2R on the recording surface of the magnetic disk 1, the rotational control process of the VCM 4 and the SPM 5, and the information reproduction process or information recording process on the magnetic disk 1. That is to say, the CPU 41 controls each block provided in the HDD 10 so that the controller 60 acts as a servo controller or a read/write controller based on firmware. The CPU 41 uses the RAM 42 as a working memory or a program memory for such control. The CPU 41 according to the embodiment performs an information evaluation process for evaluating, on a bit basis, the reliability of a plurality of pieces of information read repeatedly in the information reproduction process.

The RAM 42 is a working memory used in the RDC 31, the CPU 41 and the HDC 50. The RAM 42 is also a program memory for the firmware executed by the CPU 41. The RAM 42 according to the embodiment is used during the information reproduction process by the CPU 41. DRAM (SDRAM) or SRAM, which is volatile memory, may be used as the RAM 42.

The NVRAM 43 is a nonvolatile memory which has stored therein program data executed by the CPU 41. The program stored in the NVRAM 43 may be updated. The NVRAM 43 may also be used as a storage area which has stored therein parameter values used in a plurality of processes controlled by the CPU 41. Information for the information reproduction process may be recorded in the NVRAM 43. Note that part of the data area of the magnetic disk 1 may be used as a storage area instead of the NVRAM 43.

The HDC 50 performs a communication process for transmitting and receiving information to/from the host device 100. The HDC 50 performs a predetermined process on the decoded information output from the RDC 31 for encoding, and transmits the encoded information to the host device 100 as transmit information. The HDC 50 also performs a predetermined process on the receive information received from the host device 100 for decoding, and outputs the decoded information to the RDC 31 as information to be recorded. When encoded or decoded information has an error, the HDC 50 performs an error correction process on the information. As an example, the HDC 50 communicates with the host device 100 in compliance with standards such as SATA (Serial Advanced Technology Attachment) and SAS (Serial Attached SCSI). When the HDC 50 receives a read command from the host device 100, the HDC 50 extracts information regarding a logical address from the received read command and outputs it to the CPU 41. In addition, when information recorded on this logical address is output from the RDC 31, the HDC 50 encodes this information and transmits it to the host device 100.

With such a configuration, the information reproduction process is performed in which information is read out from the recording surface of the magnetic disk 1 by a plurality of blocks provided in the HDD 10 according to the embodiment. The information reproduction process according to the embodiment includes an information evaluation process for evaluating the reliability of information which was read out. In this information evaluation process, the same information is read repeatedly in accordance with the judgment result of the reliability of the reproduced information, and the reliability of a plurality pieces of information read repeatedly is evaluated on a bit basis with a high degree of accuracy. That is to say, the HDD 10 according to the embodiment suitably acquires more reliable information based on a plurality of pieces of information acquired as a result of repeated reading.

Figure 2:
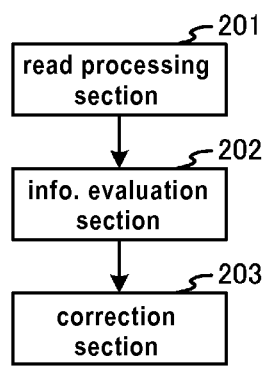
FIG. 2 is a block diagram illustrating components that execute an information reproduction process and an error correction process according to an embodiment.

Next, referring to FIG. 2, blocks included in the HDD 10 and performing an information reproduction process and an error correction process according to the embodiment will be described. FIG. 2 is a configuration diagram illustrating blocks included in the HDD and performing an information reproduction process and an error correction process according to the embodiment.

The HDD 10 includes a read processing section 201, an information evaluation section 202 and a correction section 203. These blocks are formed by sections of the HDD 10 including a part of the circuit blocks, and the firmware executed by the CPU 41. The information reproduction process and the error correction process according to the embodiment are performed by these blocks.

The read processing section 201 reads out information from the magnetic disk 1 by the read head 2R provided in the slider 2 based on the indication from the host device 100 or the indication from the inside of the HDD 10. The read information read out from the magnetic disk 1 is output to the RDC 31 through the head IC 22. The information reproduction process performed by the read processing section 201 includes the positioning process of the read head 2R and the rotational control process of the VCM 4 and the SPM 5. Further, the information reproduction process is performed as a result that the CPU 41 controls the operation of a plurality of blocks based on the firmware stored in the NVRAM 43 or the magnetic disk 1. In the information reproduction process according to the embodiment, the same information is read repeatedly by the indication from the inside of the HDD 10. The read processing section 201 provides the information that was read out to the information evaluation section 202.

The information evaluation section 202 performs an information evaluation process for evaluating, on a bit basis, the reliability of a plurality of pieces of information acquired as a result of repeated reproduction by the read processing section 201. In the information evaluation process, based on information indicating the credibility of each of the plurality of pieces of information which were generated by the RDC 31 and read out, the information evaluation section 202 generates information for correction with higher reliability, resulting from averaging the values on a bit basis and adopting the averaged value. The information evaluation section 202 uses an LLR (Log Likelihood Ratio) which is output from a soft decision Viterbi decoder (SOVA decoder), for example, as information indicating the credibility of the information which was read out. The information evaluation process is implemented by the CPU 41, based on the firmware stored in the NVRAM 43 or the magnetic disk 1. The information evaluation section 202 provides the generated information to the correction section 203. Note that the information evaluation process may be performed by a hardware block included in the RDC 31 or the HDC 50 instead of the CPU 41.

The correction section 203 is a hardware block included in the RDC 31. The correction section 203 performs an error correction process on the information determined to have to been corrected during decoding of the read information performed by the RDC 31. The error correction process according to the embodiment performs error correction on the more reliable information generated by the information evaluation section 202 based on the plurality of pieces of information read repeatedly by the read processing section 201. The error correction process is performed by the indication of the CPU 41 to the RDC 31 based on the firmware stored in the NVRAM 43 or the magnetic disk 1.

With such a configuration, the information reproduction process including the information evaluation process for suitably evaluating a plurality of pieces of information read repeatedly, and the error correction process on the generated information based on the result of the information evaluation process are performed. That is, with the information reproducing apparatus according to the embodiment, more reliable information can be acquired suitably based on a plurality of pieces of information acquired as a result of repeated reading.

Figure 3:
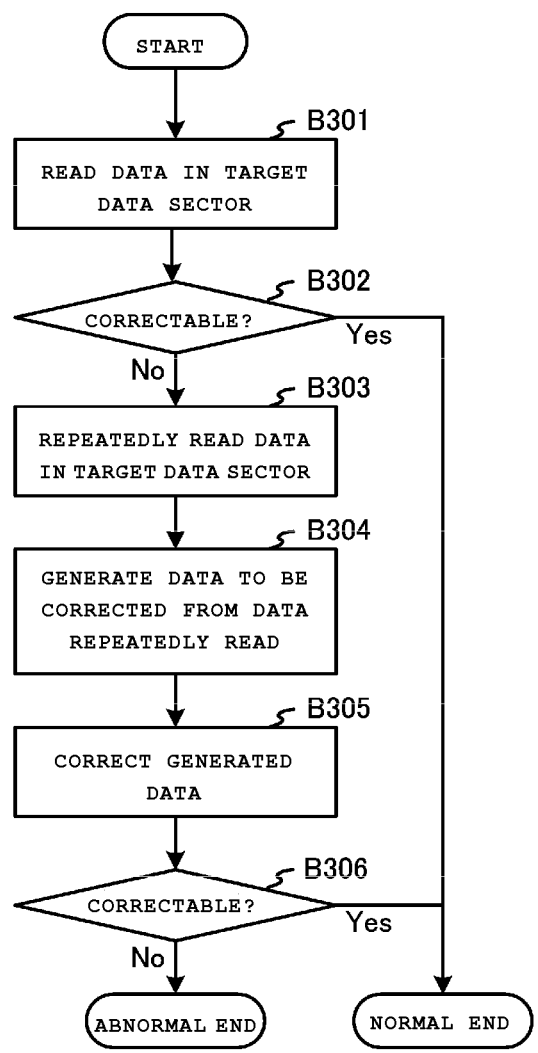
FIG. 3 is a flow chart illustrating the operation of the information reproduction process and the error correction process according to the embodiment.

Next, referring to FIG. 3, the operation of the information reproduction process and the error correction process performed in the HDD 10 according to the embodiment will be described. FIG. 3 is a flow chart illustrating the operation of the information reproduction process and the error correction process performed in the HDD according to the embodiment.

As described above, the information reproduction process according to the embodiment includes the information evaluation process for averaging values on a bit basis based on a plurality of pieces of information read repeatedly. According to the embodiment, a plurality of pieces of information read repeatedly is suitably evaluated, so that the error correction process can be performed on more reliable information. The information reproduction process and the error correction process according to the present embodiment are performed by the CPU 41 controlling a hardware block provided in the HDD 10 based on firmware.

When the information reproduction process starts in accordance with the indication from the host device 100 or the indication internally from the HDD 10, the read head 2R is positioned on a sector (hereinafter also referred to as a target data sector) from which data to be read are recorded, and data recorded in the target data sector is read (B301). The data that is read is subjected to the error correction process in the RDC 3, and it is judged whether it is correctable (B302). If the data is correctable (YES of B302), the information reproduction process ends normally.

On the other hand, if the data is not correctable (No of B302), the CPU 41 performs the positioning process of the read head 2R in the target data sector and repeatedly reads the data (B303). That is, data recorded in the target data sector is read out repeatedly. The data read out is stored in a read buffer (e.g., RAM 42).

Based on information indicating the credibility of each data that are read out repeatedly, the CPU 41 generates information for correction with higher reliability, which is used for subsequent error correction, resulting from averaging the values on a bit basis and adapting the averaged value (B304). The CPU 41 uses the RAM 42 as a working memory to perform this process. An index value, which may be an LLR in the Viterbi decoding or a metric margin of a maximum likelihood path in the Viterbi decoding, may be used for averaging the values on a bit basis, the averaged values indicating the credibility of data on a bit basis. An example use of the index value is described below in conjunction with FIGS. 4 and 5. The information with higher reliability generated in this manner is subject to error correction process in the RDC 3 (B305).

Then, whether or not the information is correctable is determined (B306), and, if correctable (Yes of B306), the information reproduction process normally ends; on the other hand, if not correctable (No of B306), the information reproduction process abnormally ends.

In this manner, the information reproduction process and the error correction process according to the embodiment are performed by the CPU 41 and the RDC 3. With the information evaluation process included in the information reproduction process, values are averaged on a bit basis based on each of data that are read out repeatedly. That is, the HDD 10 according to the embodiment can suitably evaluate a plurality of pieces of information read repeatedly and can perform the error correction process on more reliable information.

Next, referring to FIGS. 4 and 5, an example of the evaluation result of a plurality of pieces of information read repeatedly in the information reproduction process according to the embodiment will be described. FIG. 4 is an example of the evaluation result of a plurality of pieces of information read repeatedly in the information evaluation process according to the embodiment, and FIG. 5 is another example of the evaluation result of a plurality of pieces of information reproduced repeatedly in the information evaluation process according to the embodiment.

First, an exemplary evaluation result on a bit basis shown in FIG. 4 will be described. In the example of FIG. 4, the results from reading three times are shown, and, for example, as an index value used for evaluating values on a bit basis, the metric margin of a maximum likelihood path in the Viterbi decoding is used. This index value is provided as information indicating the credibility for all bits in the information read out in each of three times of reading, "1" (=100%) representing the highest credibility, and "zero" (=0%) representing the lowest credibility. For example, for bit 0, a first read value is "1" and the index value corresponding to the result of reading is 450 (=0.45), a second read value is "1" and the index value corresponding to the result of reading is 30% (=0.30), and a third read value is "1" and the index value corresponding to the result of reading is 25% (=0.25).

A plurality of pieces of data which are readout repeatedly are averaged on a bit basis and evaluated. Specifically, an index value is used as a weighting coefficient, and the results reading three times are averaged on a bit basis. For bit 0, the value 1*0.45+1*0.30+1*0.25="1.0" is obtained. Similarly, regarding bits 1, 2 and 3, for bit 1, the value 0*0.45+0*0.30+0*0.25="0.0" is obtained, for bit 2, 1*0.45+0*0.30+1*0.25="0.7" is obtained, and for bit 3, 0*0.45+1*0.30+1*0.25="0.55" is obtained. When each of these values is rounded off, the value (bit 0, 1, 2, 3)=(1, 0, 1, 1) is obtained. Such evaluation on a bit basis is performed on all bits (bit 0 to bit N) on the reading results.

In this manner, according to the example shown in FIG. 4, for a plurality of pieces of information read out repeatedly, a value resulting from the value on a bit basis of each result of reading and the index value for each reading can be used to generate information having a more reliable value.

Next, an exemplary evaluation result on a bit basis shown in FIG. 5 will be described. In the example of FIG. 5, the results of reading three times are shown, and, for example, an LLR in the Viterbi decoding is used as an index value used for evaluating the values on a bit basis. This index value is represented as information indicating the likelihood that the value is "0" or "1" on a bit basis in the information read out in each reading. In LLR, when the credibility that the value of a bit in the information that was read out is "1" is high, a positive number is presented, and when the credibility that the value is "0" is high, a negative number is presented. Further, in LLR, the greater the absolute value of the presented value, the higher the credibility is. Generally, LLR is shown using the following expression:

$$LLR=ln(P1/P0)$$

wherein, P1 is the value representing the probability that the value of the bit is "1", and P0 is the value representing the probability that the value is "0". Note that the sum of P1 and P2 becomes 1.

That is to say, the index value of the example shown in FIG. 5 is information indicating the credibility of the value on a bit basis for each bit in the read information. For example, for bit 0, the LLR of the first reading is "−0.85". This indicates that the credibility of the value being "0" is higher than the credibility of the value being "1". Further, the LLR of the second reading is "−0.62", and the LLR of the third reading is "−0.41".

The data read out repeatedly are averaged on a bit basis and evaluated. Specifically, the LLR values (value "0" or "1" indicating the credibility) acquired by three times of reading are averaged on a bit basis. For example, for 0, the average value (−0.85+(−0.62)+(−0.41))/3≈−0.62 is obtained. As a result, the LLR value is the negative number, and the credibility of the value being "0" is higher than the credibility of the value being "1", thus, the value of the bit 0 is determined as "0". Similarly, for bits 1, 2 and 3, when values of the credibility indicating "0" or "1" acquired by three times of reading are averaged on a bit basis, values 1, 1 and 0 are determined, respectively. Such evaluation on a bit basis is performed on all bits (bit 0 to bit N) in the results of reading which were read out.

In this manner, according to the example shown in FIG. 5, for a plurality of pieces of information read out repeatedly, the value on a bit basis of each result of reading can be used to simply generate information having a more reliable value.

That is to say, as in the examples shown in FIGS. 4 and 5, with the information reproduction process according to the embodiment, a plurality of pieces of information read repeatedly are averaged on a bit basis and evaluated, therefore, a plurality of pieces of information reproduced repeatedly can be suitably evaluated, and the error correction process can be performed on more reliable information.

According to the embodiment described above, the information reproduction process and the error correction process are performed by a plurality of blocks including the CPU 41 and the RDC 3. The information reproduction process includes an information evaluation process for evaluating, on a bit basis, the reliability of a plurality of pieces of information read repeatedly with a high degree of accuracy. According to the embodiment, more reliable information can be suitably acquired based on a plurality of pieces information acquired as a result of repeated reproduction by evaluating, on a bit basis, the reliability with a high degree of accuracy.

Note that, in the embodiment described above, as an information reproducing apparatus, the HDD in which a magnetic disk serves as a recording medium is taken as an example, but embodiments are not limited thereto. By way of example, other embodiments may be applied to an SSD and a memory card in which a nonvolatile semiconductor memory (e.g., an NAND memory) serves as a recording medium, and a semiconductor memory device in which an MRAM serves as a recording medium.

The information evaluation process of the embodiment can generate information having a more reliable value based on an index value corresponding to the credibility for each of a plurality of pieces of information read out repeatedly and a value on a bit basis of each result of reading. In addition, simply based on the value on a bit basis of each of a plurality of pieces of information read out repeatedly, information having a more reliable value can be generated. That is to say, according to the embodiment, an information reproducing apparatus and an information reproducing method can be provided, capable of suitably acquiring more reliable information based on a plurality of pieces of information that are acquired as a result of repeated reproduction.

Note that, in the embodiment described above, an example in which any particular condition is not imposed on repeated reading of information has been described. However, such a condition may be changed every time information is read out. For example, a positioning target value on the track to be read may be offset every time information is read out repeatedly. Alternatively, the flying height of the slider on the magnetic disk may be changed every time information is read out repeatedly. Alternatively, the bias current amount toward a read head, and the amount of amplification of a signal read out may be changed every time information is read out repeatedly. Alternatively, an embodiment in which any parameter to be set when information is read out may be changed may be applied. That is to say, an information evaluation process using a suitable parameter when information is read out may be performed.

In addition, an embodiment in which, when a higher reliable result can be acquired when a parameter is changed for each repeated reading, the approximate value to the parameter is used to repeatedly read out information may be applied. Furthermore, an embodiment in which as a result of repeated reading, lower credible values are excluded before obtaining an average may be applied. In this manner, information is read out repeatedly based on higher credible conditions, thus, more reliable information can be suitably acquired effectively.

As another embodiment, before more reliable information acquired by the information evaluation process described above is subjected to the error correction process, the credibility of each of bit values may be further evaluated and the ability of error correction for a bit that is evaluated to have lower credibility may be improved. By placing emphasis on improving the ability of the error correction for the bit that is evaluated to have lower credibility, the probability that the efficient error correction is enabled in a shorter time and with lower amount of power consumption may be increased compared to improving the error correction ability of all bits.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information reproducing apparatus comprising:
a recording medium having data recorded thereon;
a read unit configured to read the data multiple number of times;
a data evaluation unit configured to evaluate on a bit basis, each of a plurality of pieces of data acquired by the read unit as a result of reading the data multiple number of times, and generate data to be corrected from the evaluation, and
a correction unit configured to correct an error using the data to be corrected generated by the data evaluation unit, wherein the data evaluation unit is configured to evaluate, on a bit basis, each of the plurality of pieces of data acquired by the read unit as a result of reading the data multiple times based on information representing credibility of each bit of data read out multiple times.

2. The information reproducing apparatus according to claim 1, further comprising a Viterbi decoder that outputs information about credibility of each bit that is read out.

3. The information reproducing apparatus according to claim 2, wherein the information representing credibility of each bit of data that is read out is a log likelihood ratio used in the Viterbi decoder.

4. The information reproducing apparatus according to claim 2, wherein the information representing credibility of each bit of data that is read out is a metric margin of a maximum likelihood path used in the Viterbi decoder.

5. The information reproducing apparatus according to claim 1, wherein the data evaluation unit is configured to change a parameter for reading before each of the multiple times the data is read.

6. The information reproducing apparatus according to claim 2, wherein the correction unit is configured to increase an error correction ability on a bit having low credibility.

7. An information reproducing method in an information reproducing apparatus that reproduces data read from a recording medium comprising:
reading the data from the recording medium multiple number of times;
generating data to be corrected based on evaluating on a bit basis, each of a plurality of pieces of data acquired as a result of reading the data multiple number of times; and
correcting an error using the data to be corrected, wherein said evaluating is based on information representing credibility of each bit of data read out multiple times.

8. The information reproducing method according to claim 7, further comprising:
executing Viterbi decoding on each bit of data read out multiple times to generate the information about credibility of each bit that is read out.

9. The information reproducing method according to claim 8, wherein the information representing credibility of each bit of data that is read out is a log likelihood ratio used in the Viterbi decoding.

10. The information reproducing method according to claim 8, wherein the information representing credibility of each bit of data that is read out is a metric margin of a maximum likelihood path used in the Viterbi decoding.

11. The information reproducing method according to claim 7, further comprising:
changing a parameter for reading before each of the multiple times the data is read.

12. The information reproducing method according to claim 7, wherein said correcting includes increasing an error correction ability on a bit having low credibility.

13. An information reproducing apparatus comprising:
a recording medium configured to have data recorded thereon;
a read unit configured to read data multiple number of times;
a data evaluation unit configured to evaluate on a bit basis credibility of each of a plurality of pieces of data acquired by the read unit as a result of reading the data multiple number of times, and generate data to be corrected from the evaluation; and
a correction unit configured to correct an error using the data to be corrected generated by the data evaluation unit, wherein the data evaluation unit is configured to apply the credibility of each bit that is read out as a weighting unit and compute a weighted average value for each bit, and determine each bit value based on the weighted average value thereof.

14. The information reproducing apparatus according to claim 13, further comprising a Viterbi decoder that outputs the credibility of each bit that is read out.

15. The information reproducing apparatus according to claim 14, wherein the credibility of each bit of data that is read out is a log likelihood ratio used in the Viterbi decoder and the bit value is determined to be 1 if the weighted average value is greater than 0 and to be 0 if the weighted average value is less than 0.

16. The information reproducing apparatus according to claim 14, wherein the credibility of each bit of data that is read out is a metric margin of a maximum likelihood path used in the Viterbi decoder and the bit value is determined to be 1 if the weighted average value is closer to 1 than 0 and to be 0 if the weighted average value is closer to 0 than 1.

17. The information reproducing apparatus according to claim 13, wherein the data evaluation unit is configured to change a parameter for reading before each of the multiple times the data is read.

* * * * *